UNITED STATES PATENT OFFICE.

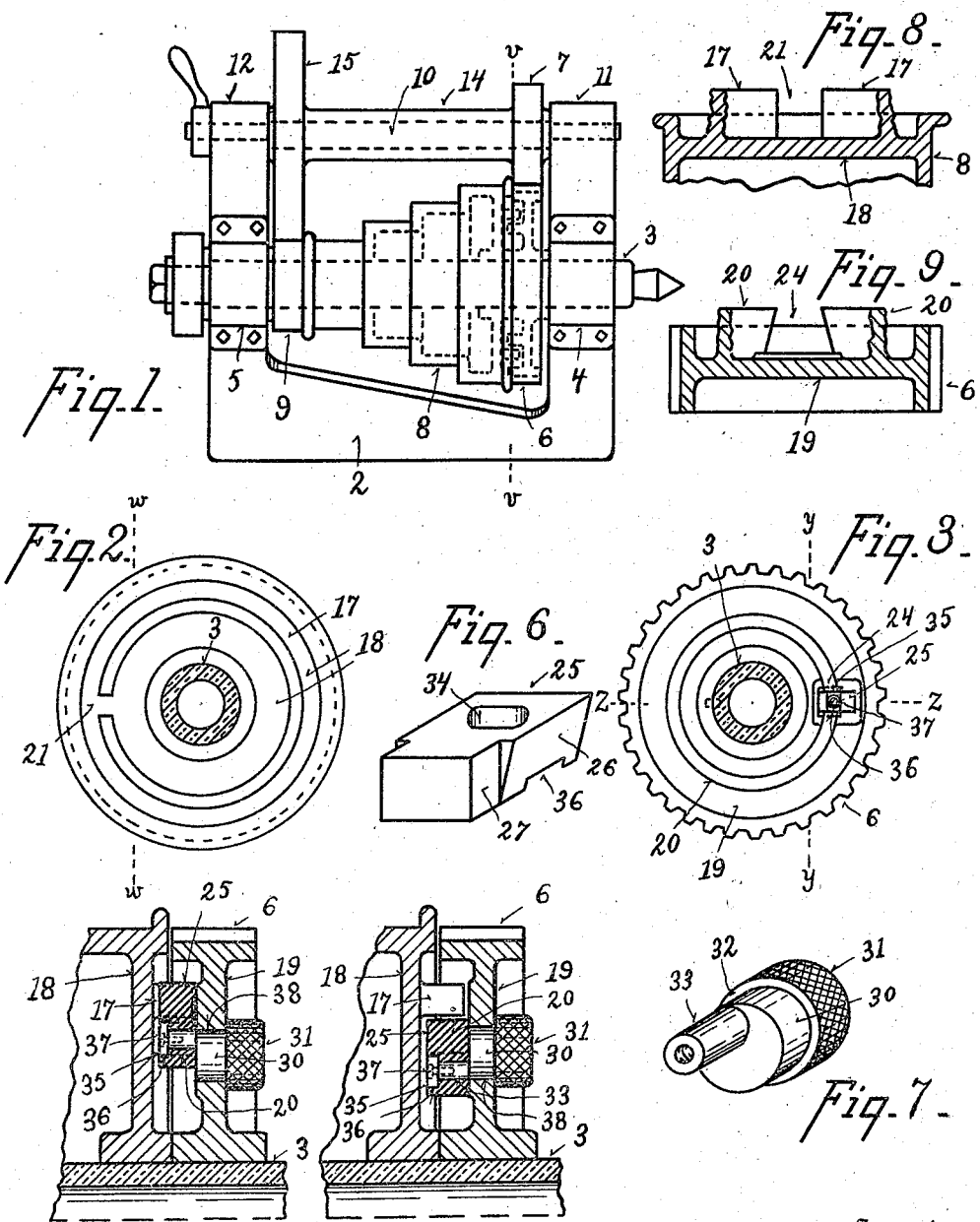

EDMUND FEILHAUER, OF CINCINNATI, OHIO.

LATHE CLUTCH MECHANISM.

1,250,826.

Specification of Letters Patent.

Patented Dec. 18, 1917.

Application filed September 26, 1916. Serial No. 122,297.

*To all whom it may concern:*

Be it known that I, EDMUND FEILHAUER, a citizen of the United States, residing at Cincinnati, in the county of Hamilton and State of Ohio, have invented certain new and useful Improvements in Lathe Clutch Mechanism, of which the following is a specification.

My invention relates to improvements in lathe mechanism. One of its objects is to provide improved mechanism to clutch the face gear and cone pulley together on the lathe spindle when the back gear mechanism is not in use. Another object is to provide such a mechanism which is simple strong and reliable and readily operable without loss of time. My invention also comprises certain details of form combination and arrangement, all of which will be fully set forth in the description of the accompanying drawings in which:

Figure 1 is a plan view of a lathe headstock embodying my improvements.

Fig. 2 is a sectional detail on line *v v* of Fig. 1 illustrating the cone pulley in end elevation.

Fig. 3 is a sectional detail on line *v v* of Fig. 1 illustrating the face gear in end elevation.

Fig. 4 is a sectional detail on line *z z* of Fig. 3 illustrating the cone pulley and face gear clutched together.

Fig. 5 is a similar view with the clutch member in retracted position.

Fig. 6 is a perspective view of the clutch member detached.

Fig. 7 is a perspective view of the eccentric shaft which serves to actuate the clutch member.

Fig. 8 is a sectional detail on line *w w* of Fig. 2.

Fig. 9 is a sectional detail on line *y y* of Fig. 3.

The accompanying drawings illustrate the preferred embodiment of my invention in which 2 represents a lathe headstock having a lathe spindle 3 journaled thereto at opposite ends in boxes 4 and 5. Mounted rigidly on the spindle 3 is a face gear 6 which is adapted to be driven from the back gear pinion 7 for slow spindle speeds and which is designed to be clutched to the cone pulley 8 when the spindle 3 is to be driven at higher speeds. The cone pulley 8 and pinion 9 are connected together and constitute a sleeve which is loosely journaled upon the spindle 3. The cone pulley is driven by belt not shown at variable speed from a counter-shaft and when the face gear 6 is clutched to the cone pulley the face gear, cone pulley and spindle all revolve together at the same speed.

An eccentrically mounted shaft 10 is journaled in boxes 11 and 12 on the headstock, and loosely journaled thereon is a sleeve 14 carrying a gear 15 to mesh with the pinion 9 and a pinion 7 to mesh with the face gear 6. When the back gears are employed, the cone pulley and pinion 9 rotate loosely on the spindle and transmit motion at a slower speed to the spindle through the gears 9 and 15, the sleeve 14 and gears 7 and 6.

In order to clutch the face gear 6 to the cone pulley when desired I provide an annular rib 17 projecting from the web 18 of the cone pulley toward the web 19 of the face gear, and a concentric annular rib 20 projecting from the web 19 of the face gear toward the web 18 of the cone pulley, the adjacent faces of said ribs 17 and 20 being close together. A rectangular notch or recess 21 is cut in the rib 17, and a dovetailed notch 24 is cut in the rib 20. A clutch member 25 with beveled faces 26 to fit the notch 24 and rectangular faces 27 to fit the notch 21 is fitted to slide in a radial direction in the notch 24. A short shaft 30 is journaled in a cylindrical hole bored through the web 19 of the face gear and is provided with a knurled head 31 having a shoulder 32 seating against the outer face of web 19. A stud 33 eccentric to the shaft 30 projects from the opposite end thereof into a slotted recess 34 in the clutch member 25 to shift said clutch member forward and backward in a radial direction. A washer 35 seated in a recess 36 in the member 25 is held in place relative to the stud 33 by a screw 37 threaded into the end of said stud 33, which serves to hold the clutch member 25 and shaft 30 in place relative to the web of the face gear.

When the notches 21 and 24 are brought opposite to each other and the knurled head 31 is rotated the clutch member 25 moves forward inserting its rectangular end into the notch 21, while the opposite end of clutch member 25 remains in engagement with notch 24, thereby clutching and locking the cone pulley to the face gear. The fit of the shaft 30 in the bore 38 is sufficiently tight to retain the clutch member 25 in any position to which it may be adjusted by the knurl 31, particularly when the stud 33 is on dead center at either extremity of the movement of member 25. Two or more notches 21 may be provided in the member 17 if desired.

There are no loose parts to become lost, the knurled head may readily be reached and operated, and lost motion avoided, and also a considerable saving of time effected. The mechanism is also strong, reliable and simple.

The mechanism herein illustrated and described is capable of considerable modification without departing from the principle of my invention.

Having described my invention what I claim is:

1. In a lathe, a lathe spindle provided with a rigidly mounted face gear, a belt pulley loosely journaled on said spindle, adjacent concentric annular ribs projecting respectively from the webs of said belt pulley and said face gear, a radial slot in one of said ribs to receive a radially movable clutch member, a radial slot in the opposite rib to support and guide a clutch member, a radially movable clutch member guided by one of said ribs and adapted to engage and disengage the slot of the opposite rib to lock said ribs together, and means journaled in the web of said face gear and operable from the opposite side of the face gear to actuate said movable clutch member.

2. In a lathe, a lathe spindle provided with a rigidly mounted face gear, a belt pulley loosely journaled on said spindle adjacent to said face gear, an annular rib carried by and projecting from the web of the belt pulley and located between the belt pulley and the face gear, said rib being provided with a clutch recess, an annular rib carried by and projecting from the web of the face gear and located between the belt pulley and face gear, said rib being provided with a radial recess to guide a clutch member, a radially movable clutch member mounted in said guides on the face gear between the face gear and belt pulley adapted to engage and disengage the recess in said pulley rib, and means operable from the opposite side of said face gear to actuate said movable clutch member.

3. In a lathe, a lathe spindle provided with a rigidly mounted face gear, a cone pulley loosely journaled on said spindle adjacent to said face gear, an annular rib carried by and projecting from the web of said cone pulley and located between said cone pulley and face gear, said rib being provided with a clutch recess, an annular rib carried by and projecting from the web of the face gear and located between the cone pulley and face gear, said rib being provided with a radial recess to guide a clutch member, a radially movable clutch member mounted in said guides carried by the annular rib of the face gear to engage and disengage the clutch recess of said cone pulley rib, an actuating shaft journaled in bearings carried by said face gear and operatively connected to said movable clutch member to enable said clutch member to be actuated from the opposite side of the face gear.

In testimony whereof I have affixed my signature in the presence of two witnesses.

EDMUND FEILHAUER.

Witnesses:
C. W. MILES,
W. THORNTON BOGERT.